United States Patent
Gor et al.

(10) Patent No.: US 10,380,434 B2
(45) Date of Patent: Aug. 13, 2019

(54) VEHICLE DETECTION SYSTEM AND METHOD

(71) Applicant: KPIT TECHNOLOGIES LTD., Pune (IN)

(72) Inventors: Snehal Gor, Pune (IN); Darshan Kumar Beeruka, Pune (IN)

(73) Assignee: KPIT TECHNOLOGIES LTD. (IN)

( * ) Notice: Subject to any disclaimer, the term of this patent is extended or adjusted under 35 U.S.C. 154(b) by 179 days.

(21) Appl. No.: 15/112,122

(22) PCT Filed: Jan. 16, 2015

(86) PCT No.: PCT/IN2015/000028
§ 371 (c)(1),
(2) Date: Jul. 15, 2016

(87) PCT Pub. No.: WO2015/114654
PCT Pub. Date: Aug. 6, 2015

(65) Prior Publication Data
US 2016/0335508 A1    Nov. 17, 2016

(30) Foreign Application Priority Data
Jan. 17, 2014    (IN) ............................ 159/MUM/2014

(51) Int. Cl.
*G06K 9/00*    (2006.01)

(52) U.S. Cl.
CPC ..... *G06K 9/00798* (2013.01); *G06K 9/00805* (2013.01)

(58) Field of Classification Search
None
See application file for complete search history.

(56) References Cited

U.S. PATENT DOCUMENTS

| | | | |
|---|---|---|---|
| 9,278,644 B2* | 3/2016 | Lee | B60Q 1/085 |
| 9,398,270 B2* | 7/2016 | Liken | H04N 7/183 |

(Continued)

OTHER PUBLICATIONS

Alcantarilla, P. F., Bergasa, L. M., Jiménez, P., Sotelo, M. A., Parra, I., Fernandez, D., & Mayoral, S. S. (Jun. 2008). Night time vehicle detection for driving assistance lightbeam controller. In Intelligent Vehicles Symposium, 2008 IEEE (pp. 291-296). IEEE.*

(Continued)

*Primary Examiner* — Samah A Beg
(74) *Attorney, Agent, or Firm* — Foley & Lardner LLP

(57) ABSTRACT

The present invention describes a vehicle detection system and method for detecting one or more vehicles in a dynamic varying region of interest, ROI. The system comprises a scene recognition module (101), a road topology estimation module (102), and a vehicle detecting module (103). The scene recognition module is configured for receiving either high exposure image or low exposure image for identifying condition of one or more scenes in a dynamically varying region of interest. The road topology estimation module configured for receiving either high exposure image or low exposure image for determining at least one of a curve, slope and vanishing point of a road in the dynamically varying region of interest. The vehicle detecting module is coupled with the scene recognition module and road topology module for detecting one or more vehicles on the road at night time.

20 Claims, 28 Drawing Sheets

(56) References Cited

U.S. PATENT DOCUMENTS

| | | | | |
|---|---|---|---|---|
| 9,434,382 | B1* | 9/2016 | Prokhorov | G05D 1/0293 |
| 9,713,979 | B2* | 7/2017 | Imaeda | B60Q 1/085 |
| 2007/0255480 | A1* | 11/2007 | Southall | B60T 7/22 |
| | | | | 701/96 |
| 2008/0069400 | A1* | 3/2008 | Zhu | G06K 9/3241 |
| | | | | 382/103 |
| 2009/0021581 | A1* | 1/2009 | Sun | G06K 9/00825 |
| | | | | 348/148 |
| 2009/0072124 | A1* | 3/2009 | Schofield | G05D 1/0244 |
| | | | | 250/208.1 |
| 2010/0086211 | A1* | 4/2010 | Kuehnle | G06K 9/00798 |
| | | | | 382/195 |
| 2010/0214791 | A1* | 8/2010 | Schofield | B60Q 1/1423 |
| | | | | 362/466 |
| 2011/0164789 | A1 | 7/2011 | Robert | |
| 2011/0280026 | A1* | 11/2011 | Higgins-Luthman | ......... |
| | | | | B60Q 1/143 |
| | | | | 362/466 |
| 2012/0287276 | A1* | 11/2012 | Dwivedi | G06K 9/00825 |
| | | | | 348/148 |
| 2013/0018547 | A1* | 1/2013 | Ogata | G06K 9/00825 |
| | | | | 701/36 |
| 2013/0235257 | A1* | 9/2013 | Kaida | H04N 5/2351 |
| | | | | 348/362 |
| 2013/0322697 | A1* | 12/2013 | Grindstaff | G06T 7/246 |
| | | | | 382/107 |
| 2014/0002654 | A1* | 1/2014 | Irie | G06K 9/00791 |
| | | | | 348/148 |
| 2014/0071702 | A1* | 3/2014 | Faber | B60Q 1/085 |
| | | | | 362/466 |
| 2014/0163703 | A1* | 6/2014 | Chang | G08B 13/19608 |
| | | | | 700/90 |
| 2014/0232631 | A1* | 8/2014 | Fleischmann | G06F 3/017 |
| | | | | 345/156 |
| 2015/0061493 | A1* | 3/2015 | Jeromin | B60Q 1/143 |
| | | | | 315/82 |
| 2015/0310286 | A1* | 10/2015 | Nakanishi | G06K 9/00825 |
| | | | | 382/104 |
| 2016/0012348 | A1* | 1/2016 | Johnson | G06N 5/027 |
| | | | | 706/12 |
| 2016/0240085 | A1* | 8/2016 | Otsuka | G06K 9/00805 |
| 2016/0267333 | A1* | 9/2016 | Jung | G06T 7/73 |
| 2016/0280229 | A1* | 9/2016 | Kasahara | B60S 1/0844 |
| 2016/0320181 | A1* | 11/2016 | Foltin | B60Q 1/10 |
| 2017/0064175 | A1* | 3/2017 | Furutake | G06K 9/00798 |
| 2017/0162055 | A1* | 6/2017 | Lehner | G08G 1/166 |
| 2017/0372176 | A1* | 12/2017 | Hibino | G06K 9/00798 |
| 2018/0137375 | A1* | 5/2018 | Takemura | B60R 21/00 |

OTHER PUBLICATIONS

Eum, S., & Jung, H. G. (2013). Enhancing light blob detection for intelligent headlight control using lane detection. IEEE transactions on intelligent transportation systems, 14(2), 1003-1011.*

International Search Report regarding Application No. PCT/IN2015/000028 dated Jul. 21, 2015.

Sungmin Eum et al; "Enhancing Light Blob Detection for Intelligent Headlight Control Using Lane Detection" Piscataway, NJ; vol. 14, No. 2, Jun. 1, 2013; sections I-V; Figs. 1-8, 11-5.

Alcantarilla P. F. Et Al; "Night Time Vehicle Detection for Driving Assistance Lightbeam Controller"; Intelligent Vehicles Symposium; Jun. 4, 2008; pp. 291-296.

* cited by examiner (a) (b)

(a)

(b)

(d)

(e)

(a)

(b)

VEHICLE DETECTION SYSTEM AND METHOD

FIELD OF THE INVENTION

The present invention generally relates to vehicle detection, and more particularly relates to vehicle detection system in low light conditions, such as night time.

BACKGROUND OF THE INVENTION

Advanced driver assistance solutions are gaining market day by day. Forward collision warning is one of the application which warns the driver when the host vehicle is about to collide with the preceding target vehicle. The vision application detects the preceding vehicle in day and night time and generates warning based on a calculated time to collision. Forward collision warning systems and other vision based automotive applications use different algorithms to detect vehicles in day and night time conditions.

However, the existing vehicle detection systems are not very efficient, are not convenient and are costly. There is a need for a method and system for vision based night time vehicle detection which is efficient and economical. There is a need for a system that provides a robust detection of vehicles in low light conditions in various real time scenarios and also eliminates false objects.

The conventional visual processing system lacks under a wide range of visibility conditions including country conditions (dark) and city conditions (bright). Additionally, the class of vehicles detection is particularly challenging for a number of reasons including:
- Wide variety of vehicles with different position and shape of vehicle lights.
- Vehicles with dissimilar lights. Ex., Broken light, Side light ON.
- Vehicles with no lights ON.
- Vehicle detection in city condition with so many miscellaneous surrounding lights.
- Two wheeler detection & distance estimation.

Therefore, there is a need for a vehicle detection system for detecting one or more vehicles on roads at night time. There is a need for a robust system that can identify and remove false objects that closely resemble vehicle light shapes such as street lights, traffic cones, and miscellaneous light sources; thus, providing high level of accuracy.

SUMMARY

An embodiment of the present invention describes a vehicle detection system. The vehicle detection system comprises a scene recognition module configured, for receiving one of a high exposure image and low exposure image for identifying condition of one or more scenes in a dynamically varying region of interest (ROI), a road topology estimation module configured for receiving one of the high exposure and low exposure images for determining at least one of a curve, slope and vanishing point of a road in the dynamically varying region of interest (ROI), and a vehicle detecting module, coupled with the scene recognition module and road topology module, configured for detecting one or more vehicles on the road.

Another embodiment of the present invention describes a method for detecting one or more vehicles by a vehicle detection system. The method comprises receiving one of a high exposure image and low exposure image by at least one of a scene recognition module and a road topology estimation module, identifying condition of one or more images scenes in a dynamically varying region of interest (ROI) by the scene recognition module, determining at least one of a curve, slope and vanishing point of a road in the dynamically varying region of interest (ROI), and processing the one or more images for detecting one or more vehicles in the dynamically varying region of interest (ROI).

The step of processing the one or more images for detecting one or more vehicles in the dynamically varying region of interest (ROI) comprises getting probable light sources through segmentation module, removing noise and unwanted information by a filtering module, identifying one or more blobs in a filtered image, determining properties of each identified blob, identifying one or more objects from the identified one or more blobs in the dynamically varying ROI using at least one pairing logic, and validating and verifying the one or more identified pairs of blobs.

In one embodiment, the one or more identified blobs between two or more identified pairs of blobs are verified by performing at least one method steps which comprises removing a pair of the identified blobs having smaller width out of two pairs of the identified blobs sharing the same blob, wherein column overlap of the two pairs is one of a very high and very low, removing a pair of identified blobs having larger width out of two pairs of the identified blobs sharing the same blob, wherein column overlap of the two pairs is not one of a very high and very low, and middle blob is not symmetrically located, removing a pair of identified blobs having width and height less than another pair of identified blobs, wherein the two pairs are having column overlap and zero row overlap, removing a pair of identified blobs having less strength, height and wider width than another pair of identified blobs, removing a pair of identified blobs having less strength than another pair of identified blobs, wherein the two pairs having equal width and height, and very high column overlap, removing a pair of identified blobs having larger width than another pair of identified blobs, wherein two pairs are having column and row overlap and are non-symmetric, removing a pair of identified blobs having smaller width than another pair of identified blobs, wherein two pairs having column and are symmetric, removing a pair of identified blobs placed within another pair of identified blobs, wherein two pairs having very less column overlap, and removing a pair of identified blobs placed below another pair of identified blobs, wherein two pairs having very less column overlap.

BRIEF DESCRIPTION OF THE ACCOMPANYING DRAWINGS

The aforementioned aspects and other features of the present invention will be explained in the following description, taken in conjunction with the accompanying drawings, wherein.

DETAILED DESCRIPTION OF THE INVENTION

Figure 1:
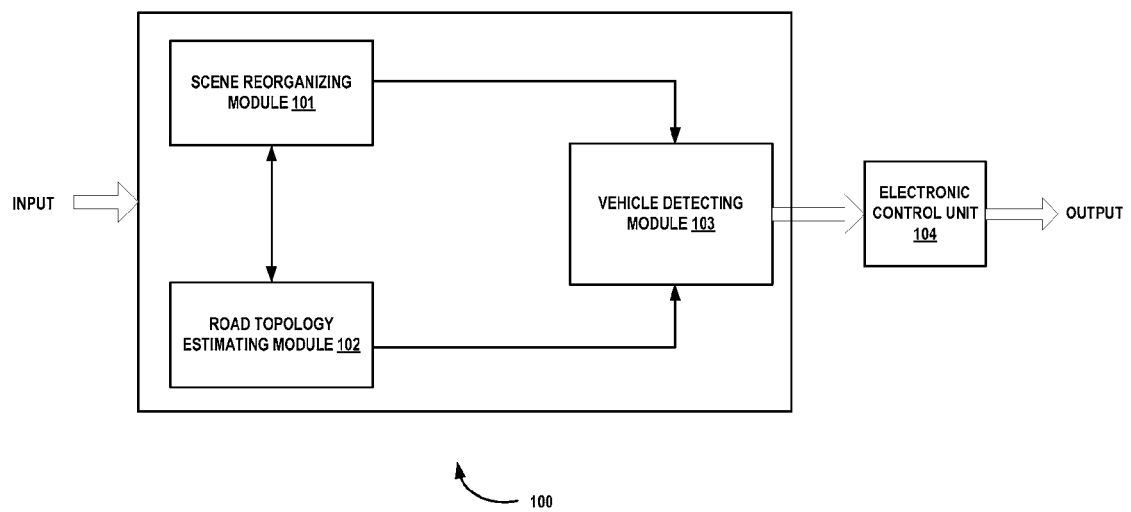
FIG. 1 illustrates a block diagram of a vehicle detection system according to an embodiment of the present invention.

The embodiments of the present invention will now be described in detail with reference to the accompanying drawings. However, the present invention is not limited to the present embodiments. The size, shape, position, number and the composition of various elements of the device of the invention is exemplary only and various modifications are possible to a person skilled in the art without departing from the scope of the invention. Thus, the embodiments of the present invention are only provided to explain more clearly the present invention to the ordinarily skilled in the art of the present invention. In the accompanying drawings, like reference numerals are used to indicate like components.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention describes a vehicle detection system and method of detecting vehicles in low light conditions occurring at night time. The detection of vehicle is required for multiple applications such forward collision warning system, dynamic high beam assistance, intelligent headlight control systems, etc. The system detects vehicles at night time using vehicle lights such as tail light as the primary feature. The system provides a robust detection of vehicles using different classifiers and identifies and eliminates false objects.

FIG. 1 illustrates a block diagram of a vehicle detection system according to an embodiment of the present invention. The vehicle detection system 100 comprises a scene recognition module 101, a road topology estimation module 102, and a vehicle detecting module 103. The scene recognition module 101 is configured for receiving one of a high exposure image and low exposure image for identifying condition of one or more scenes/images in a dynamically varying region of interest (ROI). The scene recognition module determines saturated pixels, brightness, and region variation in the dynamically varying region of interest (ROI). The road topology estimation module 102 is configured for receiving either high exposure image or low exposure image for determining one or more features of road such as curve, slope and vanishing point of a road in the dynamically varying region of interest (ROI). In one embodiment, the road topology estimation module is coupled to the scene recognition module for receiving the condition of one or more scenes/images in the dynamically varying region of interest (ROI). The vehicle detecting module 103 is coupled with the scene recognition module 101 and the road topology estimation module 102, and is configured for detecting one or more vehicles called either preceding or oncoming vehicle in front of the host vehicle on the road at night time. Here, the system works at night time condition on highway and city road. The system uses lights of the vehicle as a primary feature for the vehicle detection along with vehicle classifiers.

The images in the dynamically varying ROI are captured by an image capturing unit for providing the same (such as high & low exposure/Channels with different gains/Exposure) to the system 100. The image capturing unit maybe a vehicle camera. The input images are then converted to gray image & hue image and provided as input to the system 100. The system 100 works on Region of Interest (ROI). The scene recognition module 101 identifies the scene conditions such as Day v/s Night, in Night time Dark v/s Bright, Fog, and Rain. The road topology estimation module 102 identifies the road scenarios such as curve, slope etc. In one embodiment, the dynamic ROI is the ROI which changes with respect to change in curve and slope of the road. The road topology estimation module 102 and the scene recognition modules 101 are receiving and processing alternate set of High Exposure/gain of frames and Low Exposure/gain of frames. The system 100 is connected to an electronic control unit 104 for providing the output signal processed by the vehicle detecting module 103. The electronic control unit 104 processes the received signals for displaying or alerting the user or driver of the vehicle.

In one embodiment, the dynamically varying ROI is being calculated by the road topology estimation module 102 based on the following parameters:

Saturated pixels
Brightness
Region variation
Color

In one embodiment, the scene/image in the dynamically varying region is classified as Bright if the above parameters spreads across the ROI is high.

Figure 2:
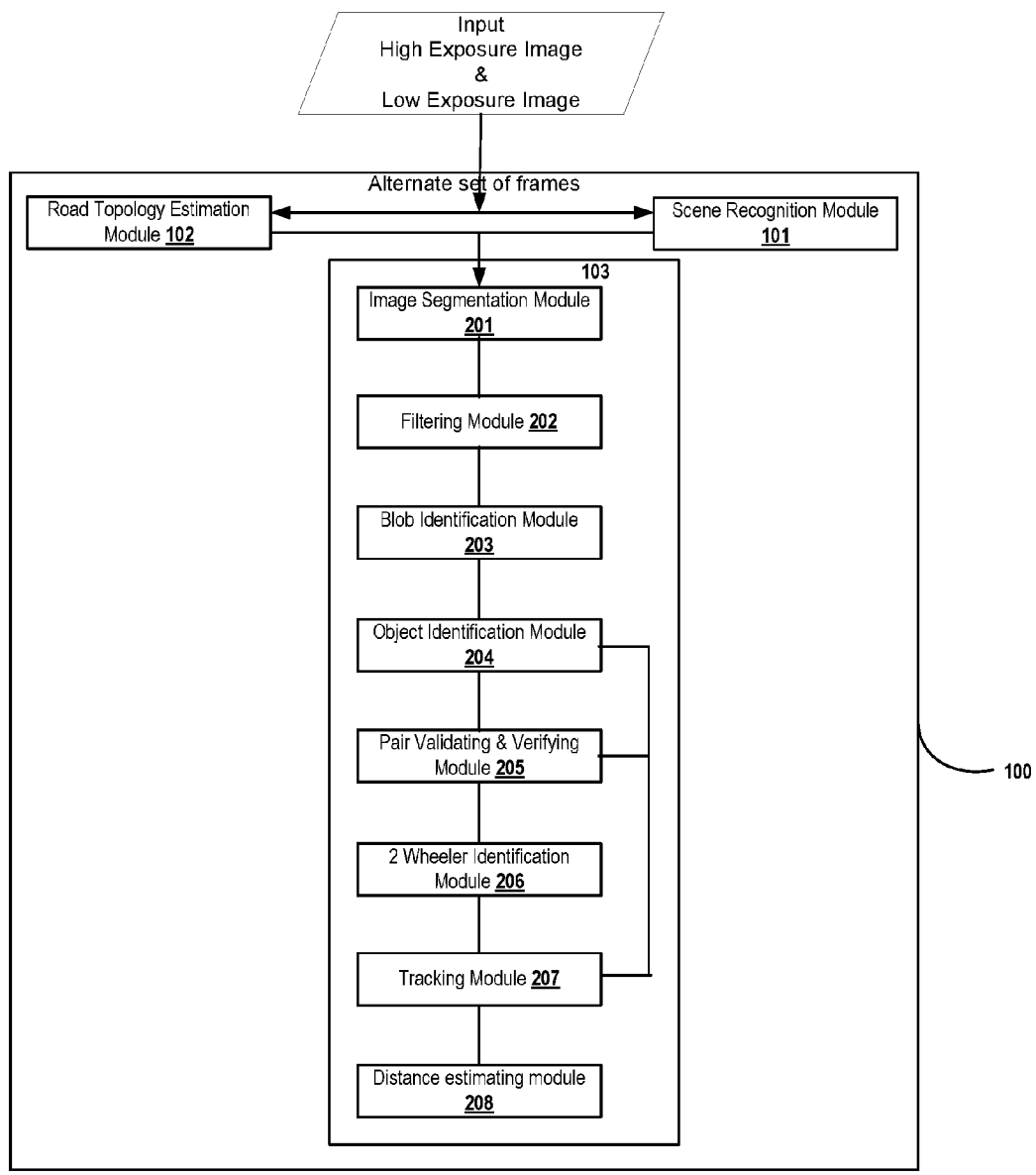
FIG. 2 illustrates a block diagram of a vehicle detection system according to one embodiment of the present invention.

FIG. 2 illustrates a block diagram of a vehicle detection system according to one embodiment of the present invention. The vehicle detecting module 103 comprises an image segmentation module 201, a filtering module 202, a blob identification module 203, an object identification module 204, a pair validating and verifying module 205, a tracking module 207, and a distance estimating module 208. The vehicle detecting module 103 additionally comprises a two wheeler identification module 206.

The image segmentation module 201 is configured for receiving an input data from either the scene recognition module 101 or the road topology estimation module 102, for providing binary image data. The binary image data includes tail lights, head lights, noise, and unwanted information.

The filtering module 202 is coupled to the image segmentation module 201, and configured for removing noise and unwanted information which are very small objects, false positives, and similar other information.

The blob identification module 203 is coupled to the filtering module 202, and is configured for identifying one or more blobs in the filtered image and subsequently determining properties of each identified blob. The blob identification module 203 is configured to perform the steps, which includes assigning an unique label to each of the one or more blobs, determining properties of each of the one or more labeled blobs, the properties comprises blob origin, width, height, box area, pixel area, number of red pixels, aspect ratio, and blob profile, determining one or more fusions of the one or more labeled blobs in one of a dark frames and bright frames based on the determined properties, and classifying the one or more labeled blobs into at least one of a head light, tail light, merged light and invalid light.

The object identification module 204 is coupled to the blob identification module 203 and configured for identifying the object based on one or more pairing logics. The object identification module 204 is configured to perform at least one of a step comprising determining horizontal overlap of the one or more blobs, determining aspect ratio of the one or more blobs, determining pixel area ratio of the one or more blobs, determining width ratio of the one or more blobs, and determining the pixel to box area ratio of the one or more blobs.

The pair validating and verifying module 205 is coupled to the object identification module 204, and is configured for validating and verifying the one or more identified pairs of blobs. The pair validating and verifying module 205 is configured for performing one or more steps which includes validating a pair of identified blobs, validating the one or more identified blobs between row of lights, verifying the one or more identified blobs between two or more identified pairs of blobs, and validating merged light by identifying one or more merged blobs. The pair of identified blobs is validated by performing steps comprises determining pair width and aspect ratio, determining number of non-paired blobs between the pair, and determining paired and non-paired blobs area as percentage of pair width. In one embodiment, the one or more identified blobs is validated between row of lights in the ROI by executing a step comprises performing a line fit algorithm across the row of lights in the ROI.

The tracking module 207 is coupled to the pair validating and verifying module 205, and is configured for tracking the one or more validated and verified pairs of blobs in one or more stages. The one or more stages include idle stage, pre track stage, track stage and cancel track stage.

The two wheeler identification module 206 is configured for determining the identified object in the ROI as a two wheeler which is based on the one or more blobs information received from the blob identification module 203 and the pair validating and verifying module 205. The one or more blobs information comprises the blobs that are either classified head light or tail light in blob identification module & passed through rider shape profile classifier in near distance. In one embodiment, the blob identification module 203 identifies a single blob in the region of interest (ROI) in order to determine a two wheeler.

The tracking module 207 is coupled to the pair validating and verifying module 205 & two wheeler identification module 206, and configured for tracking the one or more validated and verified pairs of blobs/blob in one or more stages. The one or more stages include idle stage, pre track stage, track stage and/or cancel track stage.

The distance estimating module 208 is configured to calculate the distance between one or more detected vehicles and a host vehicle based on ratio of the product of physical width of the detected vehicle size and focal length of the lens, and the product of width of the detected vehicle in image and factor for converting from pixels to meters for a camera.

Figure 3:
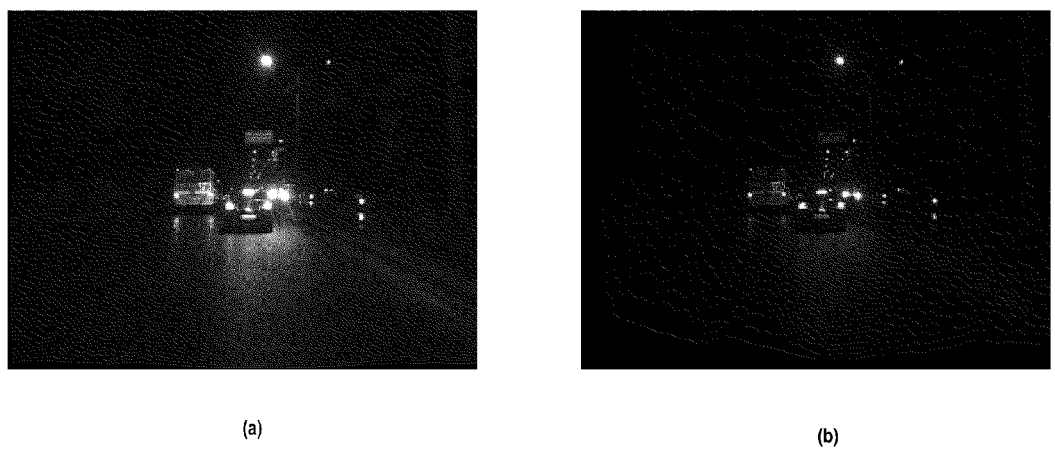
FIG. 3 depicts captured images of vehicles in a dynamically varying ROI according to an exemplary embodiment of the present invention.
Figure 4:
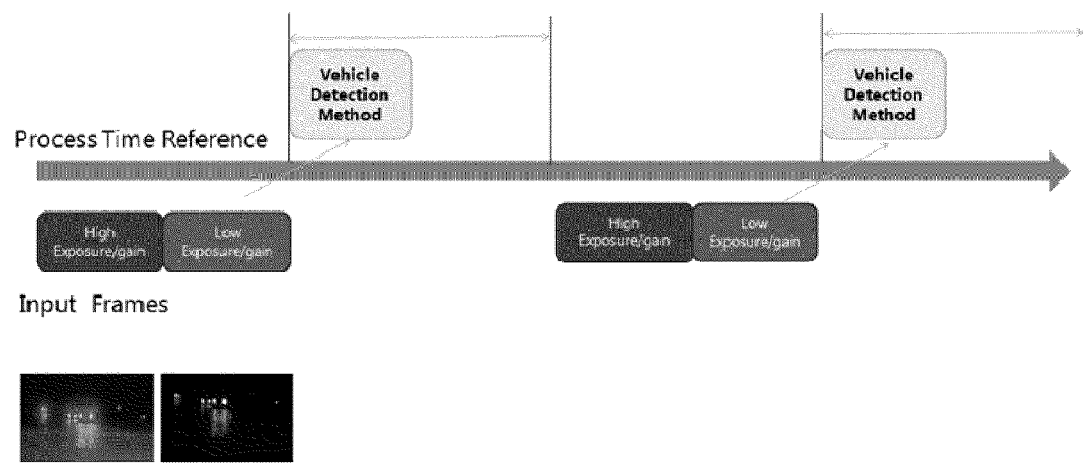
FIG. 4 depicts input frames alternatively provided to the scene recognition module and the road topology estimation module according to an embodiment of the present invention.

FIG. 3 depicts captured images of vehicles in a dynamically varying ROI according to an exemplary embodiment of the present invention. The system uses lights of the vehicle as a primary feature for the detection and classification of the vehicle. An image capturing unit attached at a predefined position on the vehicle, captures the images and provides the captured image to the system 100. The system 100 uses high exposure image (shown in FIG. 3a) and low exposure image (shown in FIG. 3b). The image capturing unit provides captured images as input frames which includes high exposure/gain and low exposure/gain. The input frames are provided alternatively to the scene recognition module and the road topology estimation module as shown in FIG. 4.

Figure 5:
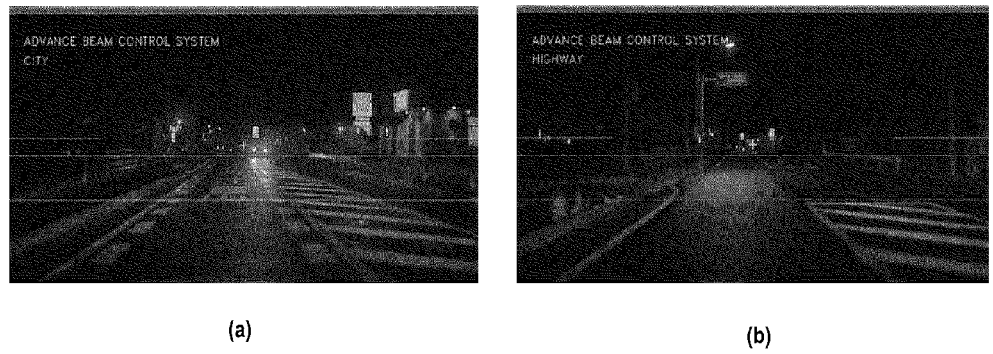
FIG. 5 illustrates captured images of a dynamically varying ROI according to an exemplary embodiment of the present invention.

FIG. 5 illustrates captured images according to an exemplary embodiment. The image is captured by the image capturing unit and provided to the scene recognition module. The scene recognition module 101 processes the received images and classifies the image/scene as bright/dark/fog/rain, if parameters such as saturated pixels, brightness, color and region variation across the ROI is high. The image/scene classification accumulated across time & hysteresis is added to determine change in the classification.

Figure 6:
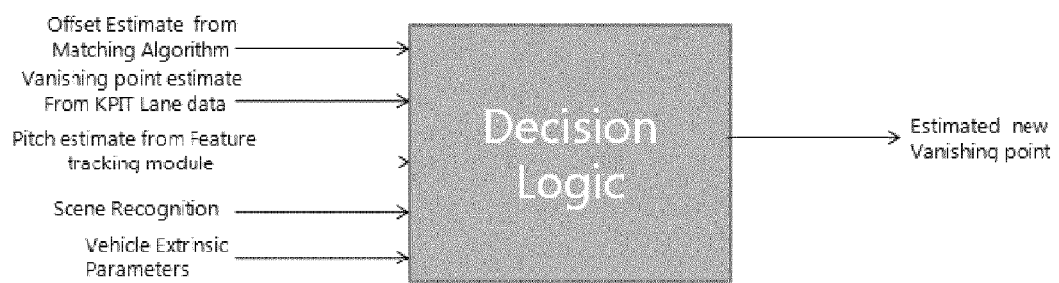
FIG. 6 illustrates a block diagram of a road topology estimation module according to an embodiment of the present invention.
Figure 7:
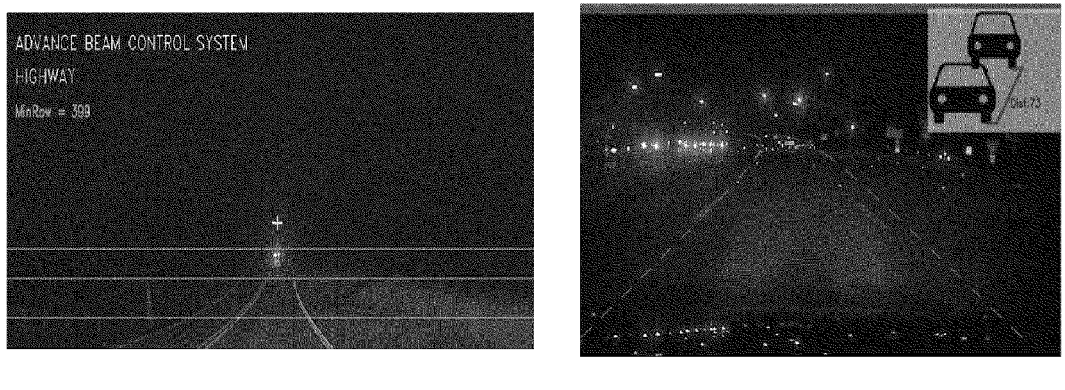
FIG. 7 depicts dynamic varying ROI changing with respect to slope and a curve of the road according to an exemplary embodiment of the present invention.

FIG. 6 illustrates a block diagram of a road topology estimation module 102 according to an embodiment of the present invention. In this embodiment, the road topology estimating module 102 calculates the estimated vanishing point for a determined ROI. The ROI (Region of Interest) in an image is the area where a user looks for potential vehicle—Front road scene without sky region. The road topology estimating module 102 receives inputs such as offset estimate, vanishing point estimate, pitch estimate, scene recognition and vehicle extrinsic parameters to determine/estimate the vanishing point of the road. The dynamic ROI is the ROI which changes with respect to slope and a curve of the road as shown in FIGS. 7 (a) & (b).

For curve estimation, the road topology estimating module 102 uses host vehicle yaw rate and speed in order to estimate curvature ahead.

Figure 8:
FIG. 8 depicts a captured image for segmentation according to an exemplary embodiment of the present invention.

For slope estimation, the vehicle detection system uses following cues to identify slope ahead
    Matching/Registration based Tracking to identify offset between successive frames
    Inputs from the LDWS (Lane Departure Warning System)
    Pitch estimate from Feature tracking module.
    Scene Recognition output such as day or night etc
    Vehicle Extrinsic parameters such as yaw rate, speed etc
Following are the advantages of using dynamic ROI:
    Vehicles can be detected on curved roads
    Reduces false positives
    Unnecessary processing can be avoided thereby improving system performance
Image Segmentation FIG. 8 depicts a captured image for segmentation according to an exemplary embodiment of the present invention. In this embodiment, the lights shown in the input low exposure/gain image and high exposure/gain image are segmented using sliding window based dual thresholding. The threshold value for the 1-D fixed/variable length local window is calculated from the mean of the pixel values in the window and the predefined minimum and maximum values. The predefined minimum value can be adjusted based on the brightness of the image. For brighter condition, the minimum value for threshold moves further up while for darker conditions the threshold value moves to a predefined value. Either fixed window or variable size window is used to calculate threshold value in the ROI. The value of the pixel in the image is modified based on the threshold value. For example, seven segmented images are formed with seven different threshold values calculated by varying predefined minimum and maximum values. The output of the segmentation is the binary image as shown in FIG. 9.

Figure 10:
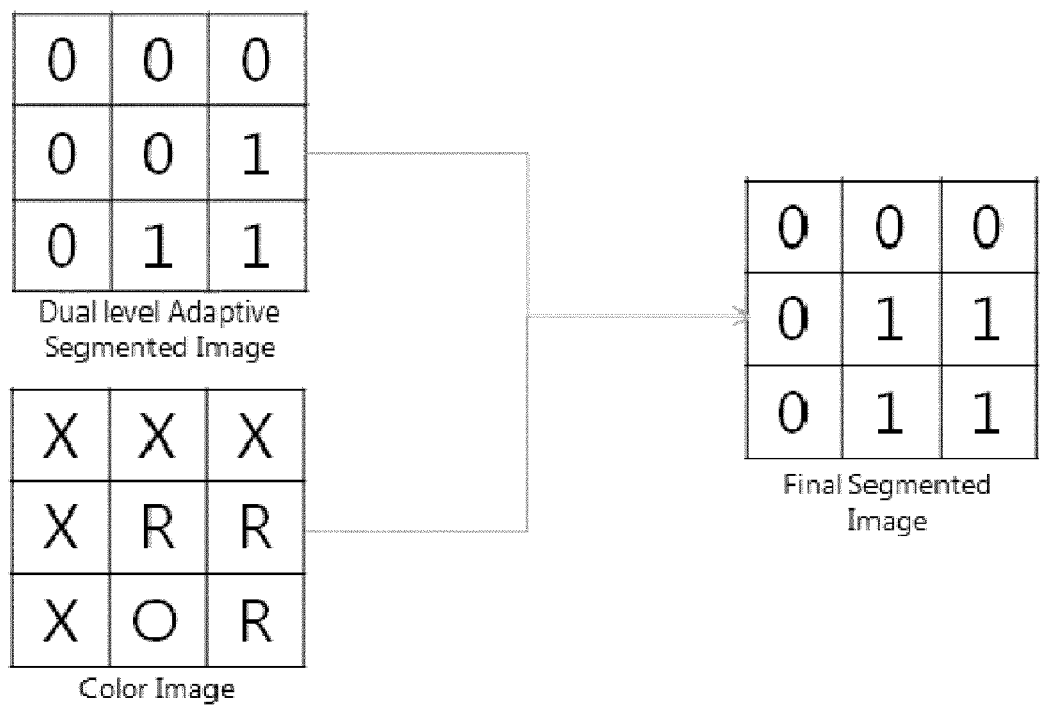
FIG. 10 depicts a 3×3 matrix in order to perform hue image segmentation according to an exemplary embodiment of the present invention.

For hue image segmentation, the hue image and segmented input image (obtained using grayscale image) are taken as the inputs. Based on the color information of the hue image, the size of the region is increased around segmented light region. Decision of the pixel value around segmented light pixel is decided based on 8 neighborhood red color hue threshold such that low light condition or far region tail light size will be increased. For example, a 3×3 matrix as shown in FIG. 10, the value of middle pixel is decided based on the segmented pixel (i.e. '1') and the hue image. The hue image should have red color hue for tail light condition. The dual level adaptive segmented image and the color image are processed to derive final segmented image.

Filtering

Figure 9:
FIG. 9 depicts an output image derived after performing segmentation according to an exemplary embodiment of the present invention.
Figure 11:
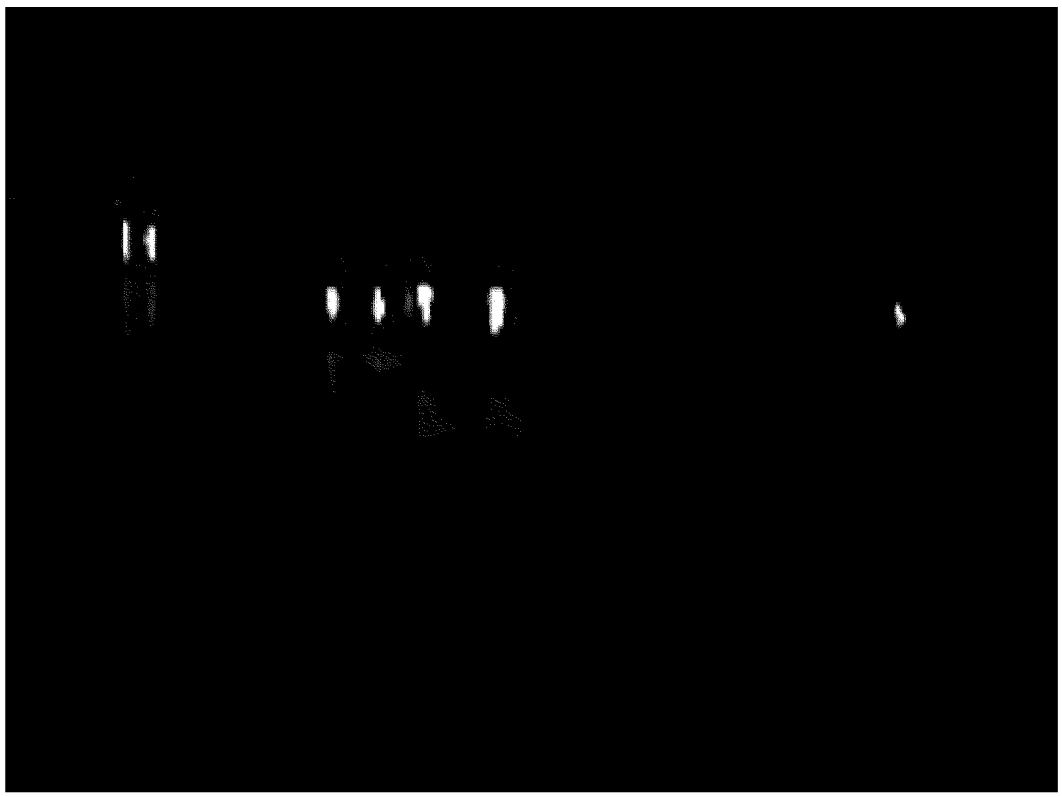
FIG. 11 depicts an output image after the filtering is performed on the segmented image according to an exemplary embodiment of the present invention.

The segmented binary images as shown in FIG. 9 consist of taillights, noise and unwanted information. The noise and unwanted information is removed using filtering. The filtering can be done using morphological operations or median filtering. The morphological operations like erosion and dilation is used with structuring element of size three, so it removes blobs of size below 3×3. The median filtering is designed such that it removes blobs size below 2×3 and 3×2. Based on the scene—for brighter scene erosion & for darker scene median filtering-filtering is applied on the segmented image. The filtering is performed on all the different threshold segmented images based on scene. The output of the filtering module is the filtered image as shown in FIG. 11. From the filtered image, prominent group of segmented pixels (blobs) are identified.

Figure 12:
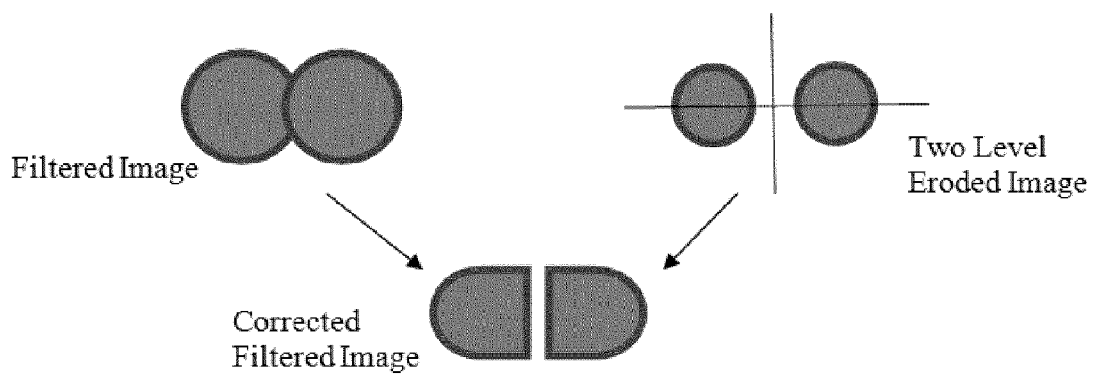
FIG. 12 depicts separation of the two merged blobs according to an exemplary embodiment of the present invention.
Figure 13:
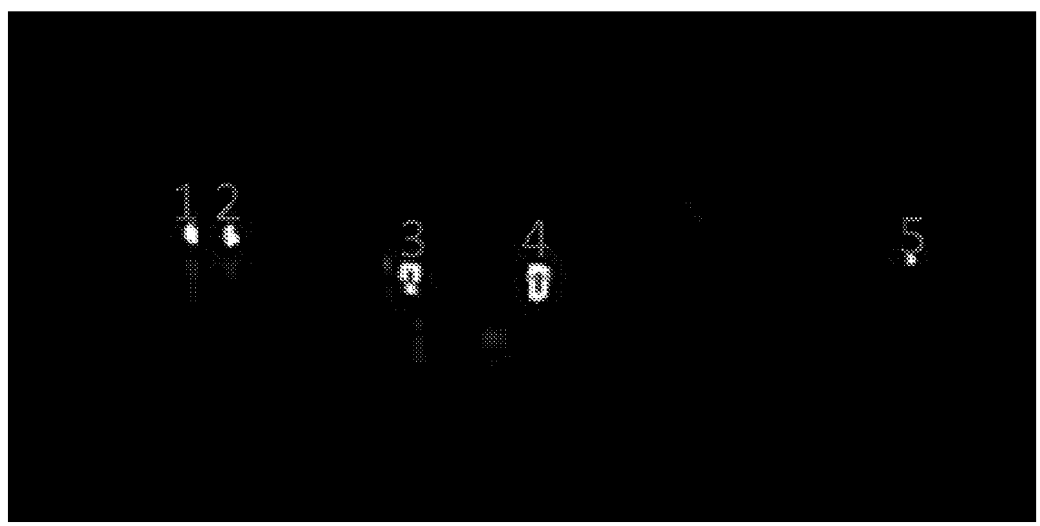
FIG. 13 depicts an image in which each blob is assigned different labels according to an exemplary embodiment of the present invention.

Separating Merged Blobs:

The system 100 additionally comprises a sub-module to separate the two merged blobs—two tail/head lights, tail/head light with other lights, tail/head light with reflection, etc.—in the filtered image. The system 100 applies two level of erosion with 3×3 kernel to the segmented image to determine and separate the two merged blobs. Following process is performed on the filtered images to separate the two merged blobs as shown in FIG. 12.
    If filtered image has one blob while two levels eroded image have two blobs at the same position, break the blobs in filtered image with perpendicular cut to overlap area with two blobs centered.
    If filtered image has one blob while two levels eroded image has either no blob or one blob at the same location retain the blob in the filtered image.
    If filtered image has one blob while two levels eroded image have more than two blobs at the same location avoid any change.
Blob Identification The blob identification module 203 identifies different types of blobs in the filtered image and also calculates their properties. The following steps are performed to identify the blob:
    Blob Labeling
    Blob Properties Calculation
    Blob Fusion
    Blob Classification
    Blob Labeling FIG. 13 depicts an image in which each blob is assigned different labels according to an exemplary embodiment of the present invention. For labeling, 4-connectivity method is used, in which same label is assigned to a group of pixels if they are connected via 4-connectivity method. After assigning label to each blob, information such as start row, end row, start column, end column, assigned label and pixel area are stored in an array.

Blob Properties

After assigning label to each blob, the following properties are calculated:

Blob Origin, indicates the blob is from dark frame or bright frame.

Width, includes difference between end column and start column.

Height, includes difference between end row and start row

Box Area, is multiplication of width and height (i.e. Width×Height)

Pixel Area, includes total number of white pixels in box

Number of Red Pixels, includes total number of red pixels based on Hue value

Aspect Ratio, includes Minimum (width, height)/Maximum (width, height)

Blob Profile, includes Shape of blob

Blob Fusion

Figure 14:
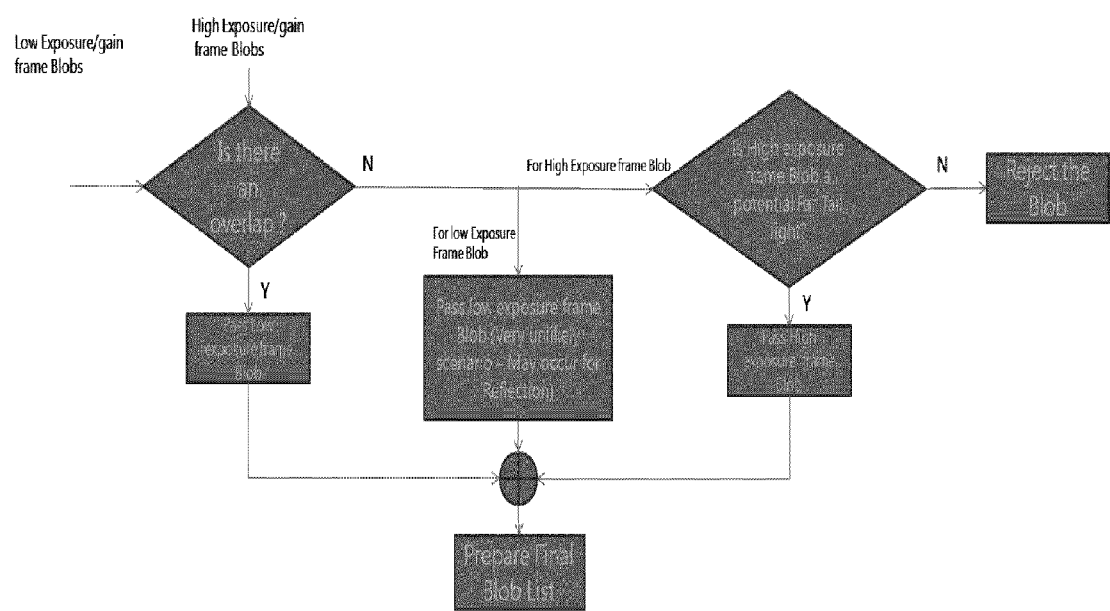
FIG. 14 illustrates a flow chart of a process for preparing a final list of blobs from dark and bright frames according to an embodiment of the present invention.

FIG. 14 illustrates a flow chart of a process for preparing a final list of blobs from dark and bright frames according to an embodiment of the present invention. At step 1401, low exposure/gain frame blob and high exposure/gain frame blob are received for determining overlap of the blobs. If there is no overlap, at step 1402, the high exposure/gain frame blob is checked for the blob to be a potential tail light. If there is no overlap, at step 1402, pass/allow the low exposure/gain frame blob to be included in the blob list. The low exposure/gain frame blob may be occurring due to reflection image. If the high exposure/gain frame blob is not a potential tail light at step 1402, reject the blob at step 1404. If the high exposure/gain frame blob is a potential tail light at step 1402, pass/allow the high exposure/gain frame blob to be included in the blob list at step 1405. If there is an overlap of the blobs at step 1401, pass/allow the low exposure/gain frame blob to be included in the blob list at step 1406. At step 1407, the final blob list is prepared.

Based on following criteria blob list is prepared:

A blob should be in estimated horizon area.

A blob should not have any other overlapping blob below it.

It should not have area between its neighbors as same intensity.

Horizontal ROI is defined from 35-65% of total width to identify potential candidates from bright frame.

From bright frame pass mainly blobs which are in pair. If it is a merged blob (high beam/low beam) then it will pass through dark frame. For pairing horizontal overlapping between two blobs. Due to movement in successive frames overlap threshold is taken very low.

If a big blob in bright frame having more than 1 blob in dark frame then consider blobs from dark frame.

Blob Classification

Figure 15:
FIG. 15 depicts images in which blobs are classified to identify head light, tail light or any other light according to an exemplary embodiment of the present invention.
Figure 15:

FIG. 15 depicts images in which blobs are classified to identify head light, tail light or any other light according to an exemplary embodiment of the present invention. Once the final list of blobs is prepared, the blobs are classified among head light, tail light, merged light and other light. A blob is tail light if red score (no. of red pixels) for the blob is greater than a predefined threshold. Tail light classification is shown in FIG. 15 (*a*) with blue color. The blob is classified as head light based on the following criterion:

a) the blob has any blob below it due to reflection; and/or b) When there is horizontal overlap between the blobs and also ratio of heights of both the blobs is less than half of maximum vehicle width; and/or c) the blob has minima with two maxima around the blob, wherein the minima and maxima pattern is determined by using vertical profiling of the particular blob.

After tail light and head light classification, all headlights having low red score and which are small in size are removed from the list by labeling them as invalid blobs. Further, if any blob has more than one blob below it then it is also labeled as invalid blob.

To classify above blob as merged blob, the patterns such as 101 and 111 is checked where 0 is corresponding to minima position and 1 is for maxima position. To determine patterns, a blob is divided into three sections and for each section min and max position are determined using the filtered image. Using these values, ratio of center to left and right section is determined to check 101 patterns. For 111 patterns, ratio of left and right section to center section is determined.

In one embodiment, the blob identification module 203 identifies a single blob in the region of interest (ROI) for determining a two wheeler.

Figure 16:
FIG. 16 depicts an image in which blobs are classified as merged blobs according to an exemplary embodiment of the present invention.

FIG. 16 depicts an image in which blobs are classified as merged blobs according to an exemplary embodiment of the present invention. If a blob is classified as merged and its size is small then the blob is considered as either tail lights or low beam lights based on its earlier classification as tail light or head light, respectively.

Pairing Logic

Figure 17:
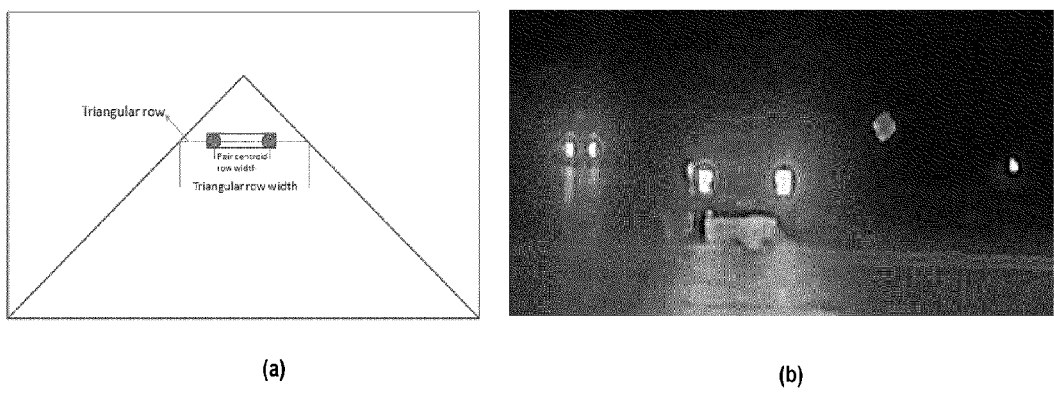
FIG. 17 depicts a process for identifying valid pair based on pairing logic according to an embodiment of the present invention.

FIG. 17 depicts a process for identifying valid pair based on pairing logic according to an embodiment of the present invention. The system 100 additionally comprises a pairing logic module which follows a heuristic based approach to determine a pair of tail lights from the blobs. The process of pairing is performed based on the criteria's listed below:

1. Check is performed for the horizontal overlap of the blobs,
2. Check is performed for the aspect ratio of the blobs,
3. Check is performed for the pixel area ratio of the blobs,
4. Check is performed for the width ratio of the blobs,
5. Check is performed for the pixel to box area ratio of the blobs,
6. For bigger blobs, check is performed to match the shape of the blobs. The blobs shape can be obtained by subtracting original blob image from the eroded image. Here, the erosion is done with structuring element of size 3. Cosine similarity is used to check the shapes of the blobs.

Cosine Similarity: It measures the similarity between the vectors of the blobs.

Cosine Similarity=A. B/∥A∥∥B∥.

Where

∥A∥ magnitude of vector A

∥B∥ magnitude of vector B

Final confidence score is calculated based on the weighted scores obtained from above checks. The pairing is performed as per score matrix with score above the threshold. The pairing is very basic with very low threshold to allow uneven tail light, side light ON and slightly out of place blobs pairing as well.

The pairs as determined above are subjected to allow vehicle width check based on dynamic ROI. Central to this entire logic is dynamic triangle which is pre-calculated & loaded at the time of System Initialization (the ROI keeps on updating as per camera & vehicle parameters).

The centroid row width of the pair should lie in between minimum and maximum triangular shape (Dynamic ROI)

row width as shown in FIG. 17(a). Output of the pairing logic (as shown in FIG. 17(b)) is the pairs which are probable vehicles.

Pair Validation and Verification (V&V)

Figure 18:
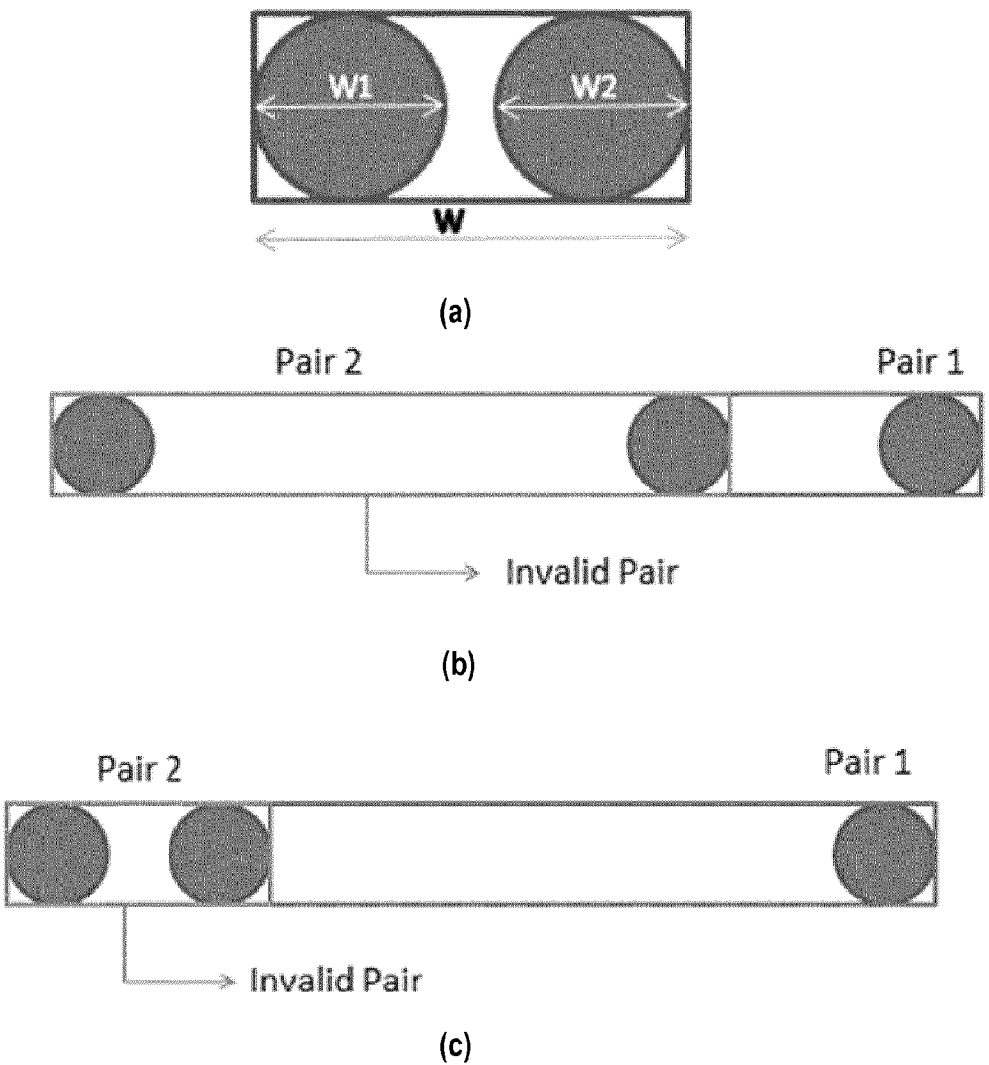
FIG. 18 depicts a method of validating and verifying blobs according to an embodiment of the present invention.
Figure 18:
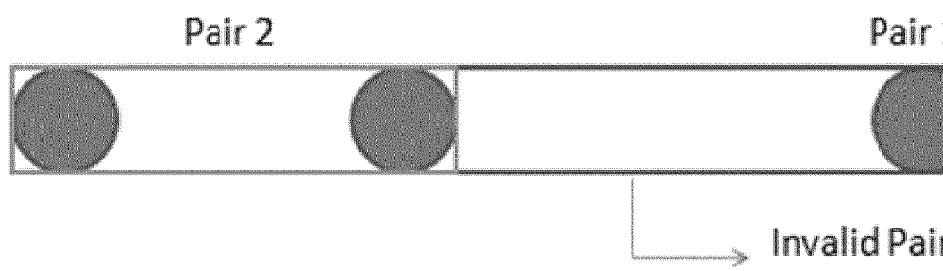
Figure 18:
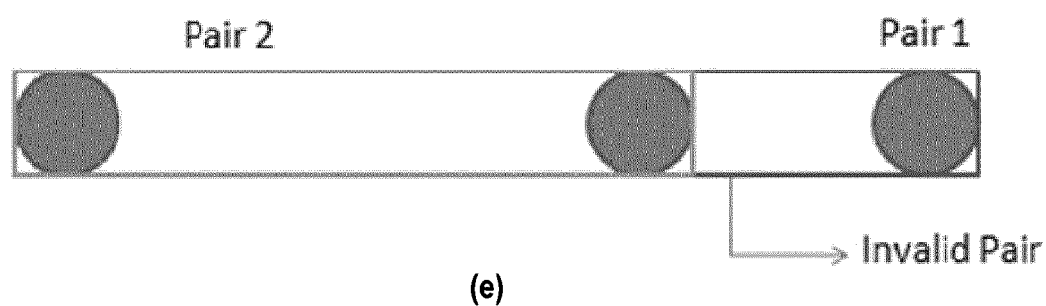
Figure 18:
Figure 18:
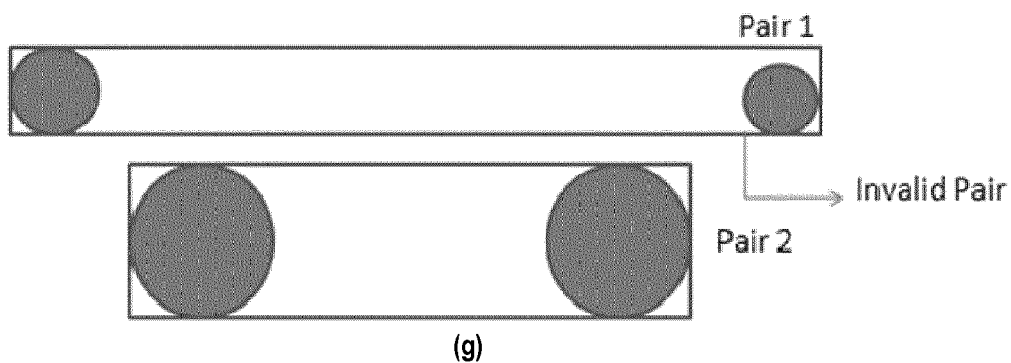
Figure 18:
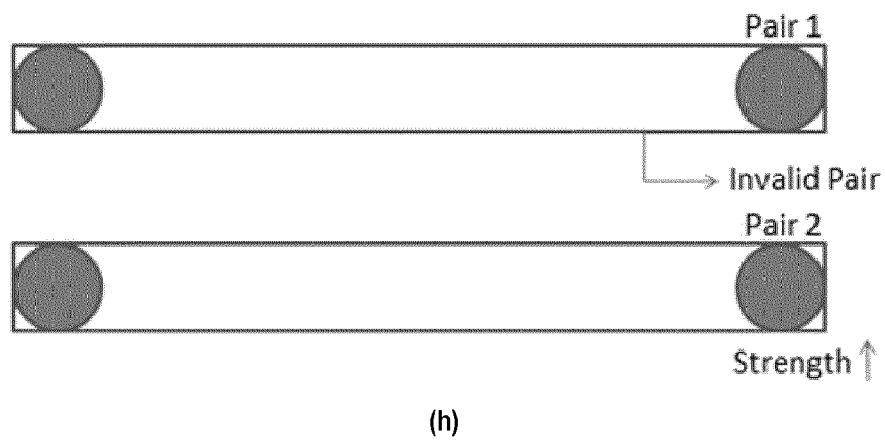
Figure 18:
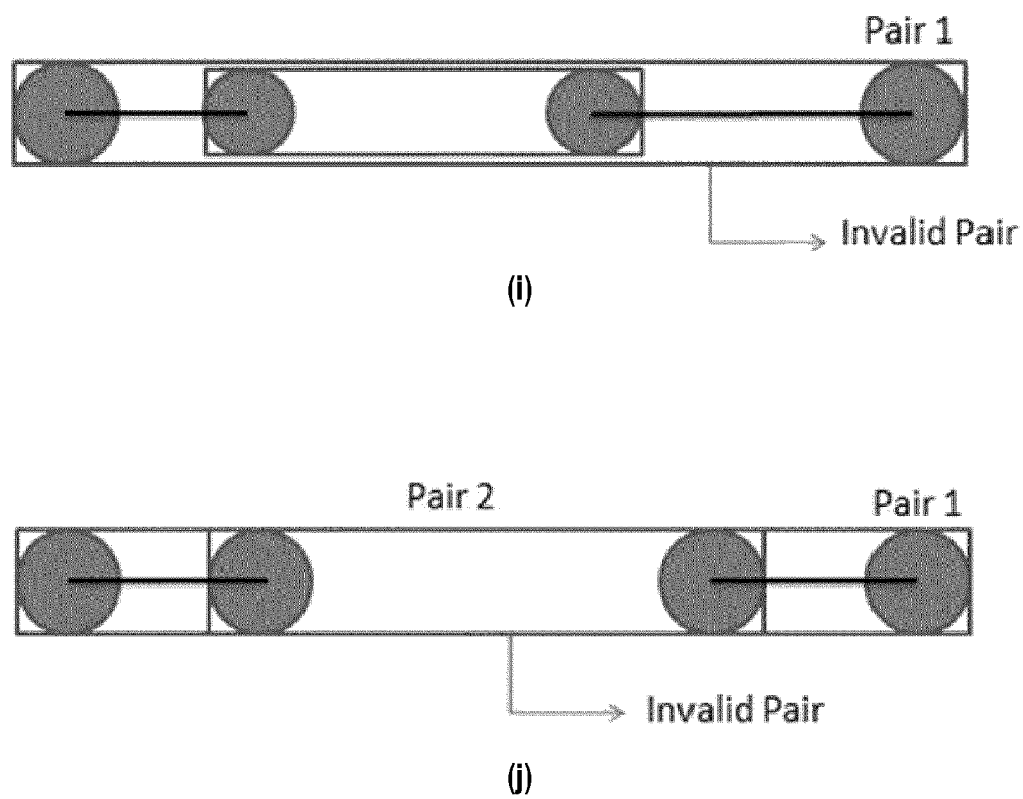
Figure 18:
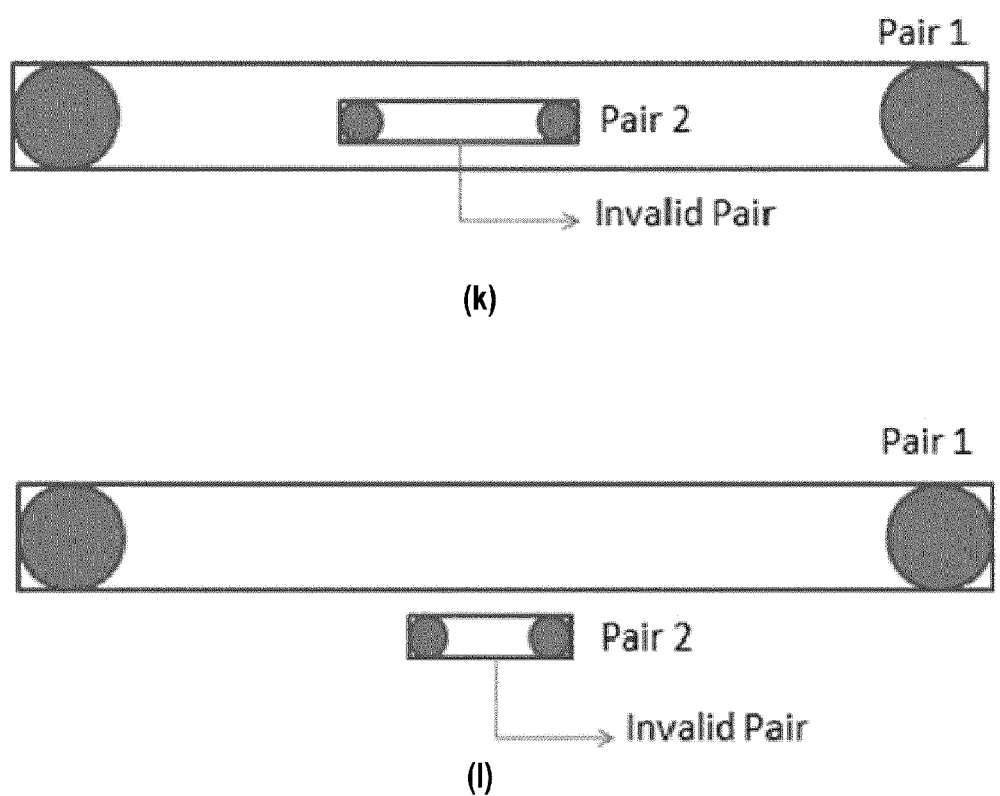
Figure 19:
FIG. 19 depicts images with pairs of blobs before and after validation and verification are performed according to an exemplary embodiment of the present invention.
Figure 19:

The pair validating and verifying module 205 validates and verifies pairs and merged blobs. Inputs to the module 205 are all the probable pairs as shown in FIG. 19 (a). This module 205 is divided into two sub modules which includes a pair validation module and a merged light validation module Pair Validation FIG. 18 depicts a method of validating and verifying blobs according to an embodiment of the present invention. The pair validation is performed on individual pairs, pairs in between row of lights and in between pairs.

Single Pair Verification:

FIG. 18 (a) depicts a method of single pair validation for the blobs according to an embodiment. In order to validate single pair of the blobs following condition needs to be fulfilled:
1. Pair width and Aspect ratio
2. Number of non-paired blobs between the pair
3. Paired and Non-paired blobs area as percentage of pair width Pair Validation in Between Row of Lights:

In one embodiment, a pair of blobs is required to be validated for a scenario of row of lights such as reflectors or street lights. In most of the cases either the reflectors or street lights are in a row. A line fit algorithm is checked across the row of lights. If the row of lights is in a line & cross ratio between pair of successive blob is same then the pair formed with those lights is not valid.

Between Pair Validation:

FIGS. 18 (b) to 18 (j) depict a method of pair verification for the blob according to an embodiment. The following rules are applied to determine actual pair of blobs out of the two pairs of blobs in the ROI:
1. If two pairs are sharing the same blob and the column overlap is very high or very low then remove the smaller width pair as shown in FIGS. 18(b) & (c).
2. If two pairs are sharing the same blob and the column overlap is not very high or low & middle blob is not symmetrically located, then remove the pair with larger width pair as shown in FIGS. 18(d) & (e).
3. If two pairs are having a column overlap and zero row overlap and the below pair width and height are less than the above pair then remove the below pair and suppose below pair height and strength are greater than above pair and width is lower than above pair then remove above pair and if the column overlap is very high and width and height are same then remove the pair with less strength as shown in FIGS. 18 (f), (g), & (h)
4. If two pairs are having column & row overlap and are non-symmetric then remove the pair with larger width and suppose there is a good symmetry with column overlap then remove the pair with smaller width as shown in FIGS. 18 (i) & (j)
5. If two pairs column overlap is very less and one pair is inside the other pair then remove the inner pair as shown in FIG. 18 (k),
6. If two pairs column overlap is very less and one pair is below the other pair then remove the below pair as shown in FIG. 18 (l).

FIG. 19 depicts images with pairs of blobs before and after validation and verification are performed according to an exemplary embodiment of the present invention. FIG. 19(a) shows four identified pairs of blobs before validation and verification performed and FIG. 19(b) depicts three valid and verified pairs of blobs after performing the check based on the method described in FIG. 18. After the pair validation in FIG. 19, the pair which satisfies the four wheeler criteria's are allowed for tracker and remaining pair are removed.

Merged Light Validation

Figure 20:
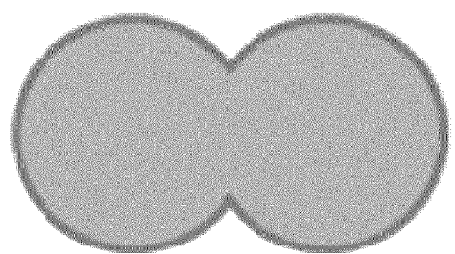
FIG. 20 depicts merged lights/blobs according to an exemplary embodiment of the present invention.

FIG. 20 depicts merged lights/blobs according to an exemplary embodiment of the present invention. In one embodiment, the merged lights are the head lights of the vehicle at far distance and need to be validated. In order to validate the merged lights, the following criteria are considered:
1. If merged light has vertical overlap with the preceding four wheeler vehicle and below it, then it is invalid.
2. If merged light has vertical overlap with the oncoming vehicle, merged light is classified as tail lights, noise, or unwanted information and if the merged light is below the oncoming vehicle then the merged light is invalid.
3. If merged light has vertical overlap with a pair having shape matching score more than a first predefined threshold for the shape matching, and the merged light score is less than a second predefined threshold. If merged light has vertical overlap with a pair having shape matching score less than the first predefined threshold, the merged light is invalid.
4. If merged light has vertical overlap and horizontal overlap with four wheeler preceding pair, then the merged light is invalid.
5. If merged light has vertical overlap, no horizontal overlap, shape matching score is greater than a predefined threshold and a merged blob score is less than predefined threshold, then merged blob is invalid.
6. If the smaller merged light is getting removed in above cases then check is performed with the merged light trackers. If the merged light has vertical overlap, horizontal overlap, area ratio, height ratio and are within the range of predefined thresholds, then the merged blobs are valid.

Two Wheeler Detection

Figure 21:
FIG. 21 depicts a method of identifying valid blob in a dynamically varying ROI for detecting two wheeler according to an embodiment of the present invention.

FIG. 21 depicts a method of identifying a valid blob in a dynamically varying ROI for detecting two wheeler according to an embodiment of the present invention. The two wheeler detection module 206 uses the blob classification information. The module 206 detects preceding and oncoming vehicle. The blobs which are not paired, not classified as merged light and classified as either head light or tail light are considered as probable two wheeler and additional checks like road gradient, rider profile through classifier, blob movement are performed to confirm the blob as a two wheeler. Check also been performed for validity of occurrence in space for example, oncoming headlight for left hand drive, the host vehicle has the blobs in right side region and for right hand drive the blobs should be in left side region. Additionally, the blobs should not have any vertical overlap with pair. The blobs which satisfy above conditions are identified as a two wheeler. FIG. 21 depicts two examples where the identified blobs are not complying the above mentioned conditions and hence considers as the invalid blobs.

Tracker

Figure 22:
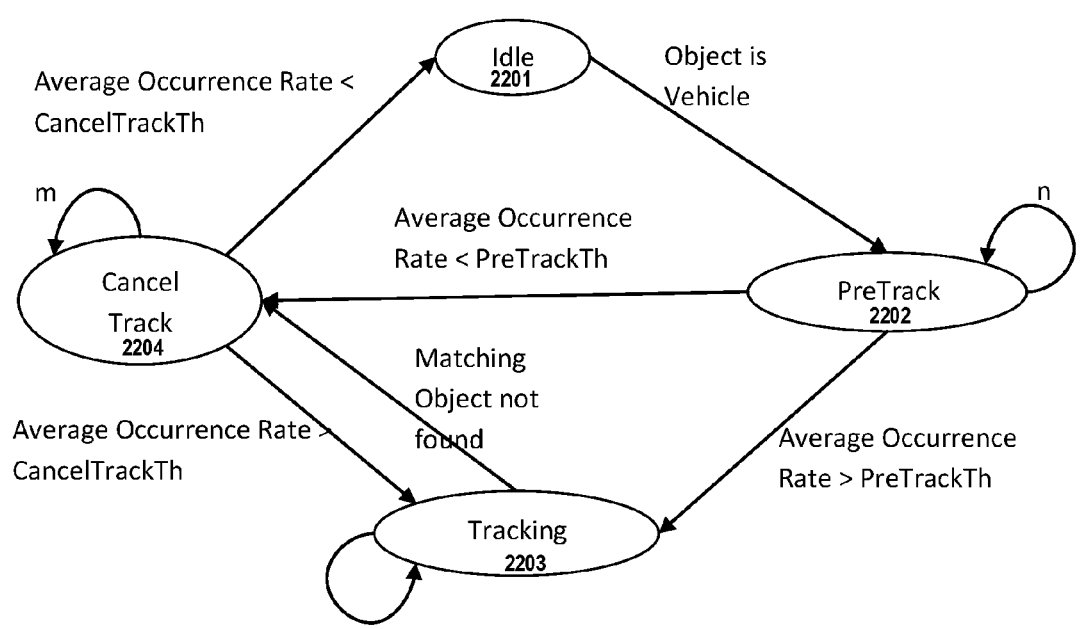
FIG. 22 illustrates the tracking module state machine cycle according to an embodiment of the present invention.

FIG. 22 illustrates the tracking module state machine cycle according to an embodiment of the present invention. The functioning of the tracking module 207 is divided into four stages which comprises of Idle 2201, pre track 2202, track 2203, and cancel track 2204. By default, the tracking module/trackers are in idle state 2201. As soon as object has been validated as a pair in case of a four wheeler)/a blob in case of a two wheeler), a fresh tracking is initiated (if no previous matching Active tracker exists) with change in state from Idle state 2201 to Pre-Track state 2202. The pre-tracking state 2202 is applied to reconfirm the existence of pair/blob. Conditions for validating a pre-tracked object as a pair/blob and moving it to the tracking state 2203 are listed below. A pre-tracked object validated as a pair/blob is moved to the tracking state 2203, only if:

It has been detected with a good confidence score in 'n' frames. The pair/blob confidence in each frame is obtained from the detection confidence returned by the pairing logic/two wheeler detection It has good frequency of occurrence It has good movement score (applicable to four wheeler vehicle only). Tracker keeps track of the behavior of the pair. Here, it is considered that both the blobs move in tandem. Opposite direction movement is allowed only for in front vehicle i.e. vehicle is coming towards or moving away from the host vehicle.

In tracking state 2203, continuous prediction and update occurs for the tracked object using Kalman filter. Any other suitable filters, known in the art, may be used.

If the tracked object is found missing in a particular frame, Kalman prediction is used to display the bounding box. Also, at the same time the tracker is moved from the tracking state 2203 to CancelTrack state 2204. In the CancelTrack state 2204, object is validated for 'm' frames. Additionally, the CancelTrack state 2204 tries to improve the continuity of the good Tracker (which are being tracked for good number of frames) through Larger area search with liberal check with motion constraints Search in high gain/high exposure frame if conditions are very dark For near vehicle pair, match for one blob is tried to extend the life For near two wheeler or four wheeler, the classifier is used to search in the neighborhood For the Cancel Track state 2204, the pair confidence for 'm' frames is obtained to decide whether to move tracker back into the tracking state 2203 or to the Idle state 2201 (not a valid pair).

Thus, in the tracking procedure, the pre-tracking and multi-frame validation reject the spurious detections, while the tracking and the Cancel Track states tend to fill the detection gaps of the corresponding objects.

In PreTrack state 'n' frames observation time window & in CancelTrack state 'm' frame observation time window is a variable. Different conditions like pair/blob class, pair/blob score & movement across the time, pair width, blinking pair/blob, curve/slope conditions makes the tracker state change decision dynamic.

Distance Estimation

Figure 23:
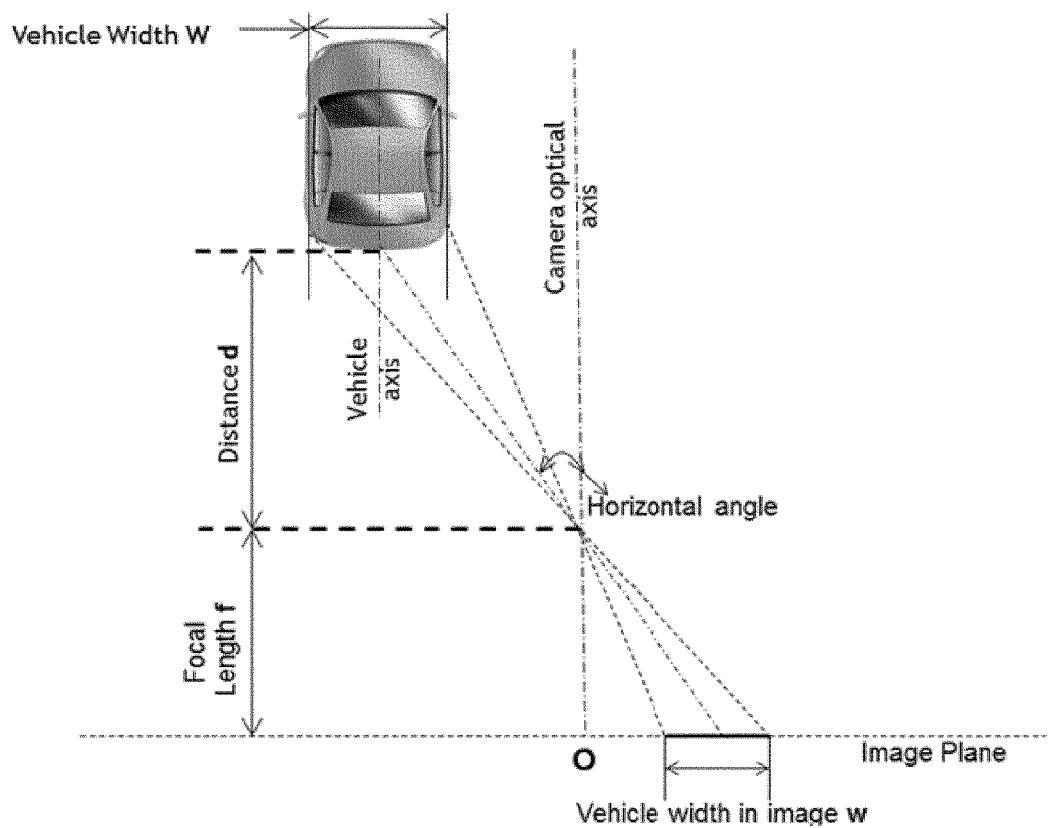
FIG. 23 illustrates an embodiment to estimate the distance between detected vehicles and host vehicle by the distance estimating module according to the present invention.

FIG. 23 illustrates an embodiment to estimate the distance between detected vehicles and host vehicle by the distance estimating module 208 according to the present invention. The distance estimating module 208 is configured to calculate the distance between at least one detected vehicle and a host vehicle based on ratio of the product of physical width of the detected vehicle size and focal length of the lens, and the product of width of the detected vehicle in image and factor for converting from pixels to meters for a camera.

In one embodiment, the distance is estimated using perspective geometry. Two triangles are perspective from a point if their three pairs of corresponding vertices are joined by lines which meet in a point of concurrence.

In perspective method, the distance between the detected vehicle and the host vehicle is estimated using below formula and which is diagrammatically shown in FIG. 23.

$$D = \frac{Wf}{wk}$$

Where,
  f: focal length of the lens (mm)
  W: Physical width of the vehicle size (m)
  w: Width of the vehicle in image (pixel)
  k: Factor for converting from pixels to meters for the CCD camera, and
  D: Distance to the target vehicle (m)

Figure 24:
FIG. 24 depicts the detected vehicles with estimated distance according to an exemplary embodiment of the present invention.

FIG. 24 depicts the finally detected vehicles with estimated distance according to an exemplary embodiment of the present invention. The vehicle detection system 100 has detected three vehicles indicated with rectangular boxes.

Figure 25:
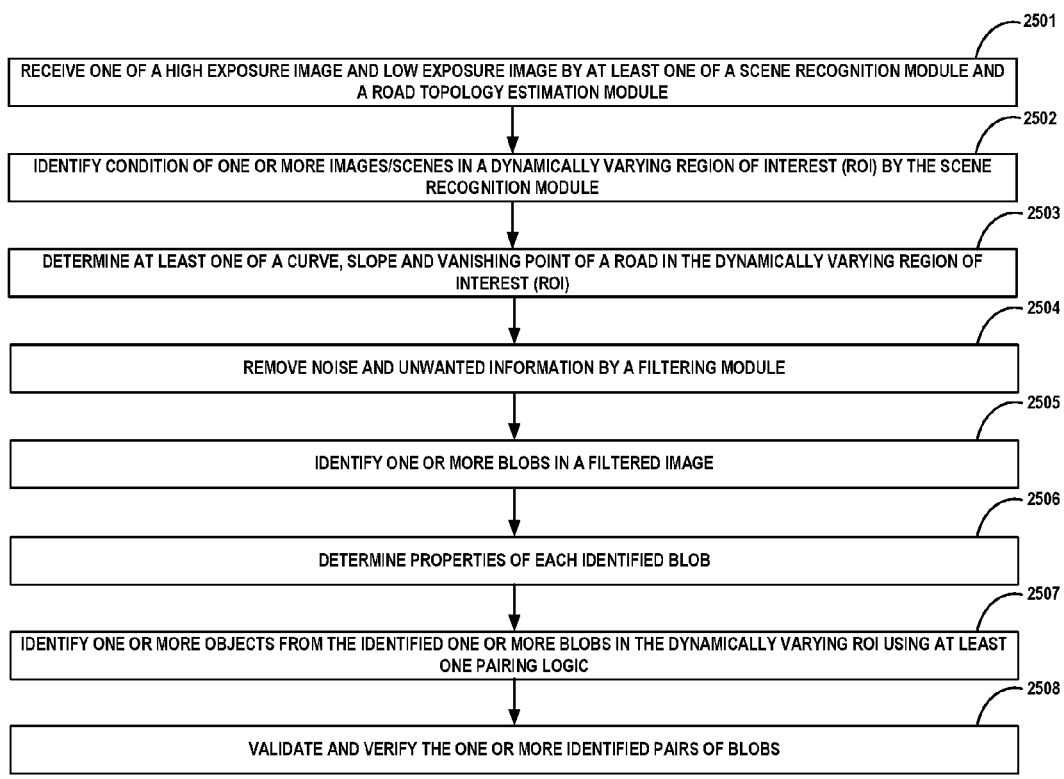
FIG. 25 illustrates the flow chart of a method for detecting one or more vehicles by a vehicle detection system according to an embodiment of the present invention.

FIG. 25 illustrates a method for detecting one or more vehicles by a vehicle detection system according to an embodiment of the present invention. At step 2501, one of a high exposure image and low exposure image is received by at least one of a scene recognition module and a road topology estimation module. At step 2502, condition of one or more scenes is identified in a dynamically varying region of interest (ROI) by the scene recognition module. At step 2503, at least one of a curve, slope and vanishing point of a road is determined in the dynamically varying region of interest (ROI). At step 2504, noise and unwanted information are removed by a filtering module. At step 2505, one or more blobs in a filtered image are identified. At step 2506, properties of each identified blob are determined. At step 2507, one or more objects from the identified one or more blobs in the dynamically varying ROI are identified using at least one pairing logic. At step 2508, the one or more identified pairs of blobs are validated and verified.

Although the invention of the system and method has been described in connection with the embodiments of the present invention illustrated in the accompanying drawings, it is not limited thereto. It will be apparent to those skilled in the art that various substitutions, modifications and changes may be made in blob identification, blob classification, pairing logic and pair validation and verification without departing from the scope and spirit of the invention.

The invention claimed is:

1. A vehicle detection system comprising a processor and memory, the memory storing instructions that, when executed by the processor, cause the processor to:
  receive a high exposure image and a low exposure image from an image capturing unit and identify a condition of one or more scenes in a dynamically varying region of interest (ROI);
  determine at least one of a curve, a slope or a vanishing point of a road in the dynamically varying ROI; and
  detect one or more vehicles on the road by:
    identifying one or more blobs including one or more high exposure blobs in the high exposure image and one or more low exposure blobs in the low exposure image;
    determining if one or more high exposure blobs overlap in a row and a column of the low exposure image with one or more low exposure blobs and compiling the overlapping one or more low exposure blobs to a blob list; and identifying one or more high exposure blobs that do not overlap in at least one of a row or a column of the low exposure image, determining if the non-overlapping one or more high exposure blobs indicates a tail light, and compiling the non-overlapping one or more high exposure blobs indicating a tail light to the blob list.

2. The system as claimed in claim 1, wherein the processor is configured to:

segment the high exposure image and the low exposure image and provide binary image data;

remove noise and unwanted information from the binary image data and provide a filtered image for each of the high exposure image and the low exposure image;

identify the one or more blobs in each filtered image and determine properties of each identified blob;

identify an object based on at least one pairing logic;

validate and verify pairs of the one or more identified blobs; and track one or more validated and verified pairs of blobs in one or more stages.

3. The system as claimed in claim 2, wherein the processor is configured to determine the object in the ROI as a two wheeler based on the one or more blobs, wherein the one or more blobs comprise blobs that are one of a head light or a tail light.

4. The system as claimed in claim 2, wherein the processor is configured to identify the one or more blobs in each filtered image and determine properties of each identified blob by:

assigning an unique label to each of the one or more blobs;

determining properties of each of the one or more labeled blobs, the properties comprising a blob origin, a width, a height, a box area, a pixel area, a number of red pixels, an aspect ratio, and a blob profile;

determining one or more fusions of the one or more labeled blobs in one of dark frames or bright frames based on the determined properties; and classifying the one or more labeled blobs into at least one of a head light, a tail light, a merged light, or an invalid light.

5. The system as claimed in claim 2, wherein the processor is configured to identify the object by at least one of:

determining a horizontal overlap of the one or more blobs;

determining an aspect ratio of the one or more blobs;

determining a pixel area ratio of the one or more blobs;

determining a width ratio of the one or more blobs; or determining a pixel to box area ratio of the one or more blobs.

6. The system as claimed in claim 2, wherein the processor is configured to validate and verify pairs of the one or more identified pairs of blobs by at least one of:

validating a pair of identified blobs;

validating the one or more identified blobs between a row of lights; or verifying the one or more identified blobs between two or more identified pairs of blobs.

7. The system as claimed in claim 6, wherein the processor is further configured to validate merged light by identifying one or more merged blobs.

8. The system as claimed in claim 6, wherein the processor is configured to validate a pair of identified blobs by:

determining a pair width and an aspect ratio;

determining a number of non-paired blobs between the pair; and determining a paired blobs area and a non-paired blobs area as a percentage of the pair width.

9. The system as claimed in claim 6, wherein the processor is configured to validate the one or more identified blobs between the row of lights in the ROI by performing a line fit algorithm across the row of lights in the ROI.

10. The system as claimed in claim 6, wherein the processor is configured to verify the one or more identified blobs between two or more identified pairs of blobs by at least one of:

removing a pair of the identified blobs having a smaller width out of two pairs of the identified blobs sharing the same blob, where the column overlap of the two pairs is one of a high overlap or a low overlap;

removing a pair of identified blobs having a larger width out of two pairs of the identified blobs sharing the same blob, where the column overlap of the two pairs is not one of the high overlap or the low overlap and a middle blob is not symmetrically located;

removing a pair of identified blobs having a width and a height less than another pair of identified blobs, where the two pairs have column overlap and zero row overlap;

removing a pair of identified blobs having a lower strength and height and a wider width than another pair of identified blobs;

removing a pair of identified blobs having less strength than another pair of identified blobs, where the two pairs have equal width and height, and high column overlap;

removing a pair of identified blobs having larger width than another pair of identified blobs, where two pairs have column and row overlap and are non-symmetric;

removing a pair of identified blobs having smaller width than another pair of identified blobs, where two pairs have column overlap and are symmetric;

removing a pair of identified blobs placed within another pair of identified blobs, where two pairs have less column overlap; or removing a pair of identified blobs placed below another pair of identified blobs, the two pairs classified as having a low overlap.

11. The system as claimed in claim 1, wherein the processor determines saturated pixels, brightness, color and region variation in the dynamically varying region of interest (ROI).

12. The system as claimed in claim 1, wherein the processor is configured to receive the condition of the one or more scenes in the dynamically varying region of interest (ROI).

13. The system as claimed in claim 1, wherein the processor is configured to calculate the distance between at least one detected vehicle and a host vehicle based on a ratio of a product of a physical width of the detected vehicle and a focal length of the lens, and a product of a width of the detected vehicle in the image and a factor for converting from pixels to meters for a camera.

14. A method for detecting one or more vehicles by a vehicle detection system comprising:

receiving a high exposure image and a low exposure image by a processor;

identifying a condition of one or more of the high exposure image or the low exposure image in a dynamically varying region of interest (ROI) by a scene recognition module;

determining at least one of a curve, a slope or a vanishing point of a road in the dynamically varying ROI;

processing the one or more of the high exposure image or the low exposure image to detect one or more vehicles in the dynamically varying region of interest (ROI);

identifying one or more blobs including one or more high exposure blobs in the high exposure image and one or more low exposure blobs in the low exposure image;

determining if one or more high exposure blobs overlap in at least one of a row or a column of the low exposure image with one or more low exposure blobs and compile the overlapping one or more low exposure blobs to a blob list; and identifying one or more high exposure blobs that do not overlap in the at least one of a row or a column of the low exposure image, determining if the non-overlapping one or more high exposure blobs indicates a tail light, and compiling the non-overlapping one or more high exposure blobs indicating a tail light to the blob list.

15. The method as claimed in claim 14, wherein processing the one or more of the high exposure image or the low exposure image comprises:

removing noise and unwanted information and providing a filtered image for each of the one or more of the high exposure image or the low exposure image;

identifying the one or more blobs in each filtered image;

determining properties of each identified blob;

identifying one or more objects from the identified one or more blobs in the dynamically varying ROI using at least one pairing logic; and validating and verifying pairs of the one or more identified blobs.

16. The method as claimed in claim 15, further comprising determining the identified object in the ROI as a two wheeler based on the one or more blobs, wherein the one or more blobs is one of a head light or a tail light.

17. The method as claimed in claim 15, further comprising tracking one or more validated and verified pairs of blobs in one or more stages by a tracking module, the one or more stages including an idle stage, a pre track stage, a track stage and a cancel track stage.

18. A method for detecting one or more vehicles by a vehicle detection system comprising:

receiving a high exposure image and a low exposure image by a processor;

identifying a condition of one or more of the high exposure image or the low exposure image in a dynamically varying region of interest (ROI);

identifying one or more blobs including one or more high exposure blobs in the high exposure image and one or more low exposure blobs in the low exposure image;

determining if one or more high exposure blobs overlap in at least one of a row or a column with one or more low exposure blobs and compiling the overlapping one or more low exposure blobs to a blob list; and identifying one or more high exposure blobs that do not overlap in the at least one of a row or a column with the low exposure image, determining if the non-overlapping one or more high exposure blobs indicates a tail light, and compiling the non-overlapping one or more high exposure blobs indicating a tail light to the blob list; and processing the one or more of the high exposure image or the low exposure image to detect one or more vehicles in the dynamically varying region of interest (ROI).

19. The method as claimed in claim 18, wherein processing the one or more of the high exposure image or the low exposure image comprises:

generating a filtered image by removing noise from a first image of the one or more of the high exposure image or the low exposure image;

identifying one or more blobs in the filtered image;

determining properties of each identified blob;

identifying one or more objects from the identified one or more blobs in the dynamically varying ROI; and validating and verifying pairs of the one or more identified blobs.

20. The method as claimed in claim 19 further comprising determining the identified object in the ROI as a two wheeler based on the one or more blobs, wherein the one or more blobs are one of a head light or a tail light.

* * * * *